May 14, 1963 R. C. BLACK ETAL 3,089,552
ROCK DRILL TIP HOLDER
Filed Oct. 24, 1961

INVENTORS
RONALD C. BLACK
EDWARD J. HOHOS
BY Brown Critchlow Flick + Peckham
ATTORNEYS United States Patent Office 3,089,552
Patented May 14, 1963

3,089,552
ROCK DRILL TIP HOLDER
Ronald C. Black and Edward J. Hohos, Pittsburgh, Pa., assignors to Mine Safety Appliances Company, a corporation of Pennsylvania
Filed Oct. 24, 1961, Ser. No. 147,253
4 Claims. (Cl. 175—400)

This invention relates to the drilling of holes into rock, coal and the like, and more particularly to a holder for a removable cutting tip.

In the drilling of bolt holes into the roofs of mines composed of coal or rock or a combination of the two, it is customary to use a hollow steel drill stem that is rotated continuously in order to drive a rotary bit at its upper end. The upper end portion of the drill is provided with side openings so that the rock dust and cuttings can be drawn down through the drill stem by an air current and disposed of in a safe location. It has been the practice heretofore to use a cutting tip that is permanently mounted in a holder attached to the drill stem. Whenever the tip required sharpening, the entire holder would have to be ground along with it. This meant that the holder did not have a very long life and therefore had to be replaced periodically by a new one.

It is among the objects of this invention to provide a rock drill cutting tip holder in which the tip is replaceable, which can be used for an indefinite period of time, which permits the rock dust and cuttings to be quickly removed, and which has a high rate of penetration.

Figure 1:
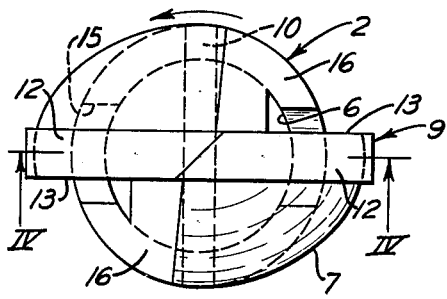
Figure 5:
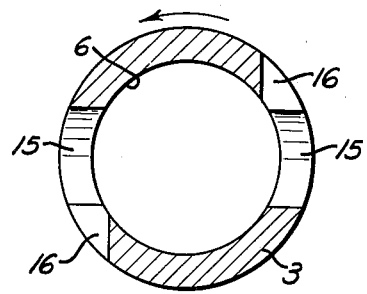
Figures 2, 3, 4:
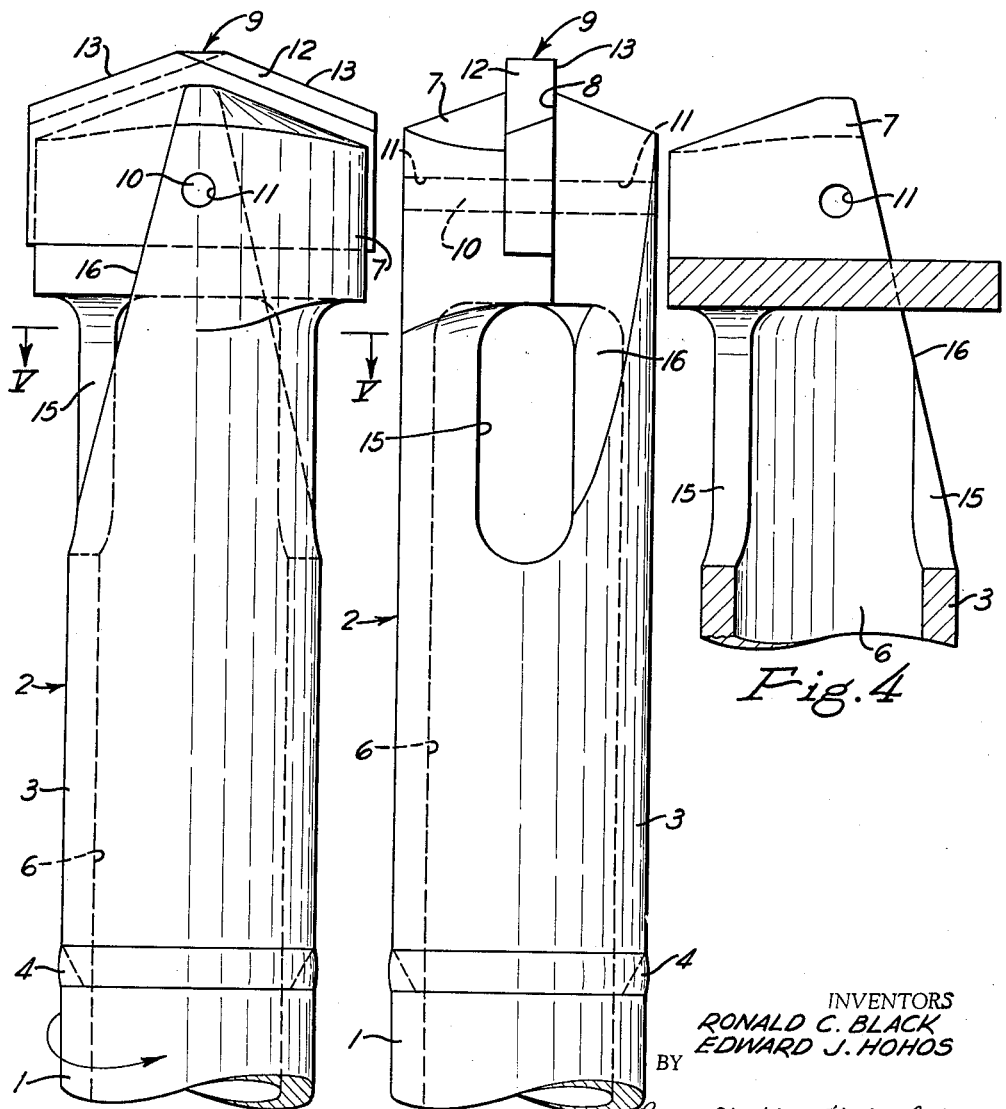

The preferred embodiment of the invention is illustrated in the accompanying drawings, in which:

FIG. 1 is an outer or upper end view of our holder with the cutting tip in place;
FIG. 2 is a side view thereof;
FIG. 3 is another side view turned 90° from the preceding view;
FIG. 4 is a fragmentary longitudinal section taken on the line IV—IV of FIG. 1 without the cutting tip; and
FIG. 5 is a cross section of the holder taken on the line V—V of FIG. 2.

Referring to the drawings, mounted on the upper end of a hollow drill stem 1 is a cutting tip holder 2. The drill stem is rotated continuously in a predetermined direction, indicated by the arrow in FIG. 2, by conventional driving apparatus (not shown). The cutting tip holder has a generally cylindrical body 3 that preferably has the same outside diameter as the drill stem. The lower end of the body may be tapered downwardly so that when it is set on the upper end of the drill stem a groove is formed around the junction of the two elements. This groove then may be filled with welding metal 4 to weld the holder to the stem.

The body of the holder is provided with an axial bore 6 that preferably has the same diameter as the passage through the drill stem. The bore extends outward or upward from the lower end of the body to a point near the outer or upper end of the holder. The portion of the holder between the closed end of the bore and the upper end of the holder forms a head 7 that is integral with body 3. The top of the head extends from its edge upward toward its center, and the head is provided with a transverse slot 8 that is open at its opposite ends and across the top of the head. Beneath the opposite ends of the slot and in close proximity to them, the side of the holder body has longitudinal inlet slots 15 through it, which open into its central bore 6. The inlet slots are so located that transverse slot 8 lies in their central longitudinal plane. The upper ends of the inlet slots most suitably terminate at about the same point as bore 6.

The portions of head 7 at the opposite sides of transverse slot 8 form the side walls thereof. Two diagonally opposite portions of those walls at the leading sides of the slot are cut away so that only the central portion of the slot has opposed side walls. The inner end of the remaining portion of each side wall has an inclined flat surface 16 that extends down past the base of the slot and along the leading edge of the adjoining inlet slot 15 to a point near its lower end. Each flat surface 16 lies in a plane that preferably is perpendicular to the opposite side of transverse slot 8. For best results, it is preferred that the upper ends of the two inclined flat surfaces terminate at points nearly midway between the ends of slot 8.

Inserted in slot 8 is a removable cutting tip 9 that is held in place by a central removable pin 10 extending through it and openings 11 through the side walls of the slot. The tip has parallel flat sides and projects from the end of the holder. The projecting portion is tapered forward and is ground to provide it with transversely inclined faces 12 and cutting edges 13. The flat sides of slot 8 provide rotational support for the cutting tip in front of them, which has exposed leading sides, while the base of the slot provides thrust support for the tip. The cutting tip is longer than the slot so that it will project a short distance beyond the opposite sides of the head to protect the latter. By removing pin 10, the cutting tip can be taken out of the holder for sharpening or replacement. Therefore, the holder is not affected by the sharpening operations and can be used indefinitely.

The head 7 preferably projects radially from the body at the outer ends of the inlet slots 15 to increase the area of contact of the head with the adjoining sides of the cutting tip insert 9.

While this drill is in operation, the dust and cuttings that it produces fall from in front of cutting edges 13 of the cutting tip down into the open areas in front of its leading faces and are directed by inclined flat surfaces 16 into inlet slots 15, through which they are drawn into the holder by the air stream continuously flowing down through the drill stem to the suction apparatus. Since the entrance slots are so close to the cutting surfaces of the tip, cuttings of considerable size quickly enter the slots instead of packing in the hole being drilled until further broken up, which would increase the friction between the tip holder and the surrounding wall of the hole. Consequently, the drill has a high rate of penetration and the life of the cutting edges of the tip is prolonged.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A dust collecting rock drill cutting tip holder having a generally cylindrical body and a head at its upper end integral therewith, the body having a lower end adapted to be joined to the upper end of a vertical tubular drill stem of the same diameter as said body and rotatable in a predetermined direction, said body being provided with an axial bore extending upward in it from said lower end, the side of the body having a pair of diametrically opposite longitudinal inlet slots therethrough opening into said bore, said head being provided with an upwardly and radially opening transverse vertical slot in the central longitudinal plane of the inlet slots for receiving a removable rock-cutting insert tip, the portions of the head at opposite sides of the transverse slot forming the side walls thereof, each of said slide walls extending from a different end of the transverse slot inwardly along its trailing side past the center of that slot but being spaced from the opposite end of the slot, the inner end portions of the side walls overlapping each other and having a pair of aligned pin-receiving openings therethrough, and the holder having a flat inclined surface extending along only the leading edge of each inlet slot from a point near its lower end upward across the inner end of the adjoining side wall of the transverse slot, the upper portions of said inclined surfaces forming the inner end surfaces of said side walls.

2. A holder according to claim 1, in which the upper ends of said inclined surfaces terminate at points about midway between the ends of the transverse slot.

3. A holder according to claim 1, in which said head projects radially from said body at the outer ends of said inlet slots.

4. A holder according to claim 1, in which each of said inclined surfaces lies in a plane substantially perpendicular to the opposite side of said transverse slot.

References Cited in the file of this patent
UNITED STATES PATENTS

| | | |
|---|---|---|
| 1,388,792 | Bernay | Aug. 23, 1921 |
| 2,679,382 | Schmidt | May 25, 1954 |
| 2,865,607 | Tilden | Dec. 23, 1958 |
| 3,022,840 | Hohos et al. | Feb. 27, 1962 |